Figure 1:
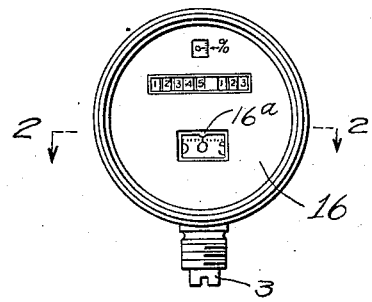

J. K. STEWART.
THERMOSTATIC DEVICE FOR VARYING MAGNETIC FIELD.
APPLICATION FILED JAN. 18, 1913.

1,082,566.

Patented Dec. 30, 1913.

Witnesses:

Inventor:
John K. Stewart
by Burton & Burton
his Atty's

UNITED STATES PATENT OFFICE.

JOHN K. STEWART, OF CHICAGO, ILLINOIS, ASSIGNOR TO STEWART-WARNER SPEED-
OMETER CORPORATION, OF CHICAGO, ILLINOIS, A CORPORATION OF VIRGINIA.

THERMOSTATIC DEVICE FOR VARYING MAGNETIC FIELD.

1,082,566.  Specification of Letters Patent.  Patented Dec. 30, 1913.

Application filed January 18, 1913. Serial No. 742,781.

*To all whom it may concern:*

Be it known that I, JOHN K. STEWART, a citizen of the United States, residing at Chicago, in the county of Cook and State of Illinois, have invented new and useful Improvements in Thermostatic Devices for Varying Magnetic Field, of which the following is a specification, reference being had to the accompanying drawings, forming a part thereof.

This invention relates primarily to instruments in which a magnet and a non-magnetic element are employed, one of them being moved by the rotation of the other through the agency of the "magnetic drag" set up by their relative movement.

The purpose of the present device is to compensate for variations of this magnetic drag due to variations in temperature by thermostatically causing a corresponding variation of the magnetic field affecting the non-magnetic element.

It consists of the features and elements described and shown in the drawings as indicated in the claims.

Figure 2:
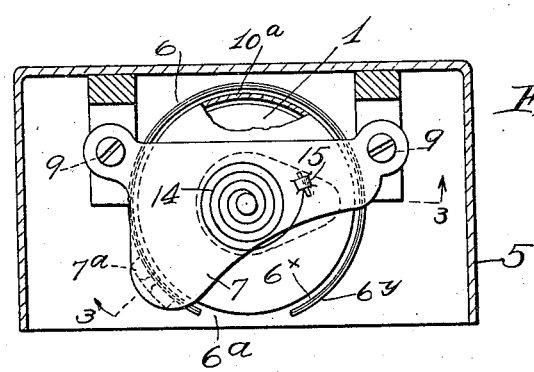
Figure 3:
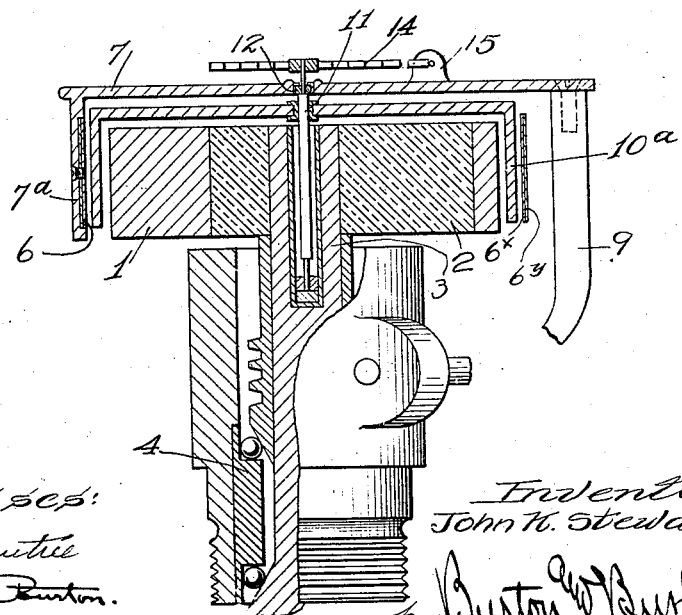

In the drawings:—Figure 1 is a face view of a magnetic speedometer embodying this invention. Fig. 2 is an interior plan view of the principal elements, being taken as a section at line 2—2 on Fig. 1. Fig. 3 is a vertical section taken as indicated at line 3—3 on Fig. 2.

The structure shown in the drawings comprises a magnet, 1, which, as illustrated, is annular with a reduced portion at one side. The magnet is mounted on a carrier, 2, fixed upon the shaft, 3, which is adapted to be connected with any shaft or wheel whose speed of rotation is to be indicated. Said shaft, 3, is journaled in a bearing, 4, mounted in a case, 5, in which the operating parts are inclosed.

6 is a field ring encompassing the magnet except as to a short distance at which a gap, 6$^a$, is made in the field ring for a purpose hereinafter explained. This field ring is bi-metallic, comprising an inner lamina, 6$^x$, of magnetic metal, as soft iron or steel, and an outer lamina, 6$^y$, of metal having a higher co-efficient of expansion under change of temperature than the inner lamina, copper or brass being suitable for the purpose. The field ring, 6, is fixedly secured in its position about the magnet by being fastened to a depending arm, 7$^a$, of a plate, 7, which extends across the magnet in front of the same and is supported by posts, 9, 9, which extend from the bearing, 4. The inner diameter of the field ring is sufficiently greater than the outer diameter of the magnet to allow space between the two for the depending flange, 10$^a$, of a cup disk which constitutes the drag element of electrically-conductive and non-magnetic metal, as aluminum, said drag element being mounted upon a spindle, 11, which is stepped in the shaft, 3, axially chambered to admit the spindle within the shaft. An upper bearing, 12, for the spindle is mounted upon the plate, 7, and above said bearing the spindle is connected to the inner end of the biasing spring, 14, whose outer end is connected at 15, to the plate, 7. The flange, 10$^a$, constituting the drag element, is exteriorly graduated and marked to indicate miles travel of the vehicle to which the instrument is attached, and this graduation is visible through the gap, 6$^a$, in the field ring and through an opening opposite said gap in the face plate, 16, which closes the forward side of the case to complete the inclosure of the mechanism, a reading point, 16$^a$, being projected from the margin of the opening into the same and standing adjacent to the graduated scale on the drag element.

The mode of operation of this instrument for indication of speed is governed by well understood principles and similar to that of familiar instruments heretofore made. The specific feature which characterizes it is the bi-metallic field ring, which by its change of form consequent upon change of temperature, contracting or expanding it, according to familiar principles, moves it with respect to the magnet so as to change the width of the annular gap between the two in which the drag element is positioned, and thereby changing the form of the field and the influence of the field upon the drag element in a manner to compensate for errors in the reading of the instrument which would otherwise result from temperature changes. Upon rise of temperature, the conductivity of the drag element being diminished, the drag effect is correspondingly diminished, and in the absence of compensation the reading of the instrument will be lowered and to that extent rendered inaccurate. The bi-metallic field ring described being contracted radially by increase of temperature by reason of the outer lamina having the higher co-efficient of expansion narrows the annular field between the magnet and the field ring, and thereby compensatingly increases the influence or effect of that field upon the drag element; and by proper relation of the two laminæ of the ring, 6, this increasing strength of the field can be made to accurately offset the diminished susceptibility of the drag element to the dragging action, therby maintaining correctness in the readings of the instrument.

I claim:—

1. In combination with a magnet, means for influencing the form of the magnetic field comprising a magnetic mass proximate to said magnet, a drag element positioned in the magnetic field, and means for producing relative movement of the magnet and drag element, said magnetic mass being comprised in a bi-metallic member mounted for movement toward and from the magnet by a change of its form under the influence of temperature change.

2. In combination with a magnet, means for influencing the form of the magnetic field comprising a magnetic mass proximate to said magnet, a drag element positioned in the magnetic field, and means for producing relative movement of the magnet and drag element, said magnetic mass being comprised in a laminated bi-metallic member mounted for movement of portions of its surface toward and from the magnet by a change of its form under the influence of temperature change.

3. In combination with a magnet, means for influencing the form of the magnetic field comprising a magnetic mass proximate to said magnet, a drag element in the form of a flanged disk mounted with its flange in the magnetic field encompassing the path of the magnet poles, and means for producing relative rotation of the magnet and drag element about the axis of the latter, said magnetic mass being comprised in a laminated bi-metallic member in the form of a split ring encompassing the flange of the drag element, said member being fixedly mounted at one point with the remainder free for movement toward and from the magnet by a change of its form under the influence of temperature change.

4. In combination with a magnet, means for influencing the form of the magnetic field comprising a magnetic mass proximate to said magnet, a drag element in the form of a flanged disk mounted with its flange in the magnetic field encompassing the path of the magnet poles, and means for producing relative rotation of the magnet and drag element about the axis of the latter, said magnetic mass being comprised in a laminated bi-metallic member in the form of a split ring encompassing the flange of the drag element, one end of said member being fixedly mounted and the remainder being free for movement toward and from the magnet by a change of its form under the influence of temperature change.

5. In combination with a magnet, means for influencing the form of the magnetic field comprising a magnetic mass proximate to said magnet, a drag element in the form of a flanged disk mounted with its flange in the magnetic field encompassing the path of the magnet poles, and means for producing relative rotation of the magnet and drag element about the axis of the latter, said magnetic mass being comprised in a laminated bi-metallic member in the form of a split ring encompassing the flange of the drag element, one end of said member being fixedly mounted and the remainder being free for movement toward and from the magnet by a change of its form under the influence of temperature change, the flange of the drag element being provided with a scale, the opening between the ends of the split ring member being sufficient to permit reading of the scale, and an index point fixed at said opening proximate to the said scale.

In testimony whereof, I have hereunto set my hand, at Chicago, Ill., this 2nd day of Jan., 1913.

JOHN K. STEWART.

Witnesses:
C. B. SMITH,
STANHOPE HUDSON.